United States Patent
Sasaki

(10) Patent No.: US 7,260,701 B2
(45) Date of Patent: Aug. 21, 2007

(54) INFORMATION REPRODUCING APPARATUS, DATA MANAGEMENT INFORMATION OBTAINING METHOD, DATA MANAGEMENT INFORMATION OBTAINING PROGRAM, AND STORAGE MEDIUM

(75) Inventor: Yoshiyuki Sasaki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/124,279

(22) Filed: May 9, 2005

(65) Prior Publication Data

US 2005/0201213 A1 Sep. 15, 2005

Related U.S. Application Data

(63) Continuation of application No. 10/337,269, filed on Jan. 7, 2003, now Pat. No. 6,918,003.

(30) Foreign Application Priority Data

Jan. 15, 2002 (JP) ............................. 2002-005824

(51) Int. Cl.
  *G06F 12/00* (2006.01)
  *G11B 7/007* (2006.01)
(52) U.S. Cl. ..................... 711/170; 711/100; 369/30.08
(58) Field of Classification Search ................ 711/100, 711/112, 113, 170; 369/30.08, 47.54, 30.07
See application file for complete search history.

(56) References Cited

U.S. PATENT DOCUMENTS

| | | | |
|---|---|---|---|
| 5,568,628 A | 10/1996 | Satoh et al. | |
| 5,717,888 A | 2/1998 | Candelaria et al. | |
| 5,825,726 A | 10/1998 | Hwang et al. | |
| 5,991,825 A * | 11/1999 | Ng ................................. 710/6 |
| 6,009,498 A | 12/1999 | Kumasawa et al. | |
| 6,304,940 B1 * | 10/2001 | Beardsley ................... 711/112 |
| 6,621,783 B1 | 9/2003 | Murata | |
| 2002/0024902 A1 | 2/2002 | Sasaki | |
| 2002/0105862 A1 | 8/2002 | Lee | |
| 2002/0114245 A1 | 8/2002 | Sasaki | |
| 2002/0124133 A1 | 9/2002 | Duruoz | |
| 2002/0159353 A1 | 10/2002 | Sasaki | |

(Continued)

FOREIGN PATENT DOCUMENTS

CN  1264121 A  8/2000

(Continued)

*Primary Examiner*—Tuan V. Thai
(74) *Attorney, Agent, or Firm*—Dickstein Shapiro LLP

(57) ABSTRACT

An information reproducing apparatus reproducing information of an information recording medium is disclosed. In the information recording medium, a record area is divided into a plurality of data areas. Also, data are recorded for each of the divided data areas. In addition, management information relating to the data recording is recorded in a predetermined management information area. Further, the management information is updated and recorded in a new management information area every time a predetermined data recording is completed. A receiving part receives, from an external device, an obtaining request for the management information. The obtaining request includes designation of a specific management information area. A management information obtaining part obtains the management information relating to the data recording from the specific management information area designated in the received obtaining request. A reporting part reports, to the external device, the management information relating to the data recording obtained from the designated specific management information area.

4 Claims, 5 Drawing Sheets

U.S. PATENT DOCUMENTS

2003/0033475 A1 2/2003 Sasaki

FOREIGN PATENT DOCUMENTS

| | | | |
|---|---|---|---|
| EP | 1026679 A2 | 8/2000 | |
| JP | H08-115269 | 7/1996 | |
| JP | H09-312086 | 2/1997 | |
| JP | H09-115269 | 5/1997 | |

\* cited by examiner

FIG.3

FORMAT OF SDCB

| PHYSICAL SECTOR OF ECC BLOCK | MAIN DATA BYTE POSITION | DESCRIPTION | NUMBER OF BYTES |
|---|---|---|---|
| 0 | D0 TO D3 | CONTENTS DESCRIPTOR | 4 |
| 0 | D4 TO D7 | UNKNOWN CONTENTS DESCRIPTOR ACTIONS | 4 |
| 0 | D8 TO D39 | DRIVE ID | 32 |
| 0 | D40 TO D42 | SESSION NUMBER | 2 |
| 0 | D42 TO D63 | RESERVED | 22 |
| 0 | D64 TO D95 | DISC ID (IN LEAD-IN ZONE ONLY) | 32 |
| 0 | D96 TO D127 | APPLICATION DEPENDENT | 32 |
| 0 | D128 TO D143 | SESSION ITEM 0 | 16 |
| 0 | ... | ... | |
| 0 | D128+I×16 TO D143+I×16 | SESSION ITEM I | 16 |
| 0 | ... | ... | |
| 0 | D128+(N−1)×16 TO D143+(N−1)×16 | SESSION ITEM N | 16 |
| 0 | D128+N×16 TO D2047 | RESERVED | 1920−N×16 |
| 1 TO 15 | D0 TO D2047 | RESERVED | 15×1048 |

FIG.4

FRAGMENT ITEM

| ITEM BYTE POSITION | DESCRIPTION | NUMBER OF BYTES |
|---|---|---|
| B0 TO B2 | FRAGMENT ITEM DESCRIPTOR | 3 |
| B3 TO B4 | FRAGMENT NUMBER | 2 |
| B5 TO B7 | FRAGMENT START ADDRESS | 3 |
| B8 TO B10 | FRAGMENT END ADDRESS | 3 |
| B11 TO B15 | RESERVED | 5 |

FIG.5

PREVIOUS SESSION ITEM

| ITEM BYTE POSITION | DESCRIPTION | NUMBER OF BYTES |
|---|---|---|
| B0 TO B2 | PREVIOUS SESSION ITEM DESCRIPTOR | 3 |
| B3 | RESERVED | 1 |
| B4 | PREVIOUS SESSION NUMBER | 1 |
| B5 TO B7 | PREVIOUS SESSION START ADDRESS | 3 |

INFORMATION REPRODUCING APPARATUS, DATA MANAGEMENT INFORMATION OBTAINING METHOD, DATA MANAGEMENT INFORMATION OBTAINING PROGRAM, AND STORAGE MEDIUM

This application is a continuation of application Ser. No. 10/337,269, filed Jan. 7, 2003, now U.S. Pat. No. 6,918,003, the entire disclosure of which is incorporated herein.

BACKGROUND OF THE INVENTION

1. Field of the Invention

The present invention generally relates to information reproducing apparatuses, data management information obtaining methods, data management information obtaining programs, and storage media that reproduce data requested by users from recordable information recording media such as DVD+Rs.

2. Description of the Related Art

Recently, with the improvement of their functions, personal computers (PCs) have been able to handle AV (Audio-Visual) information such as music and images. Since the amount of the AV information is very huge, optical discs such as CD–R (Compact Disc-Recordable) and DVD+R (Digital Versatile Disc+Recordable) have been attracting attention as information recording media. As the prices of the optical discs have been reduced, optical disc devices as information reproducing apparatuses have become widely used as one of the peripheral devices of the PCs.

There is the Universal Disc Format (UDF) standard as a file system using recordable information recording media such as CD–Rs and DVD+Rs. The UDF is the file system used for various devices and utilizing a record format that takes advantage of a characteristic of each device. Especially, CD–Rs and DVD+Rs apply the sequential UDF in which data are sequentially recorded from the inner side of a disc, since CD–Rs and DVD+Rs are write-once types that do not allow overwriting of data.

Generally, in the sequential UDF, in order to maintain the compatibility with ISO 9660, the first track is reserved and data requested from a user are incrementally written from the second track. That is, the multi-track recording system that records data by dividing a session into a plurality of tracks, which form recording units, is used.

In the above-described recording state in the sequential UDF, since an unrecorded area exists in a session, reproduction is possible only by an information recording/reproducing apparatus, and it is impossible to reproduce using an information reproducing apparatus such as a CD–ROM drive or a DVD-ROM drive. However, when file system information of record data is recorded to the first track (record file information for achieving compatibility with ISO 9660), and lead-in/lead-out is recorded and closed, it is possible to reproduce the data by a CD–ROM drive and a DVD-ROM drive. Further, CD–Rs, DVD+Rs and the like use the multi-session recording system so as to further write to such discs in which sessions are closed.

In the CD–R, the maximum track number is limited to 99 tracks, which is a small number. Thus, irrespective of the number of sessions, information of the tracks existing all over the disc is recorded in an area called program memory area (PMA). Accordingly, it is possible to manage the information of all the tracks. Hence, in a CD–R, it is possible to immediately report the information of a track requested by the user by storing, in the memory of a drive unit, the track information obtained from the PMA.

On the other hand, the DVD+R allows recording of up to 191 sessions in the record area. Each of the sessions allows recording of up to 16 tracks (referred to "fragments" in the DVD+R). That is, up to 3056 (=191×16) fragments, which is a vast number, can exist on a DVD+R. Additionally, in the DVD+R, a lead-in of the second session (and later sessions) is called an "intro", and a lead-out before the last session is called a "closure". Information (fragment number, start address of fragment, last address of fragment and the like, which are hereinafter referred to as "fragment information") relating to fragments in each session is recorded in a management information area called session disc control block (SDCB) that is recorded in the lead-in (or the intro) of the session. The SDCB includes information (session number, start address of session, last address of session and the like) relating to all sessions before the session as well as all fragment information of the session.

That is, in the DVD disc such as a DVD+R and DVD+RW, disc control blocks (DCBs) indicating the record state of the disc exist, and a means for reporting DCB information to the user is prepared. In the DVD+R, as mentioned above, there are the DCBs such as the SDCBs that include information of all sessions existing on the disc and information of all fragments existing in the session. In addition, in the DVD+RW, there is a formatting disc control block (FDCB) having information of the format state and the like. Since it is possible to overwrite the DVD+RW, when the format state is changed, the FDCB is overwritten and updated. On the other hand, since the DVD+R is a write-once disc that cannot be overwritten, the SDCB is updated and recorded in a predetermined new SDCB area every time a session or a fragment is added.

By the way, there is a case where an upper device (for example, a PC) using such an optical disc device requires, prior to reproducing an optical disc, management information relating to data recorded on the optical disc. Thus, the upper device is configured to be able to request, from the optical disc device, the management information (number of sessions included in the record area and the like, which are hereinafter referred to as "session information") relating to sessions of the optical disc and information (number of tracks included in the record area, track address indicating a track position, and the like, which are hereinafter referred to as "track information") relating to tracks.

Corresponding to this, when the optical disc is a DVD+R, for example, the optical disc device reports the above-described fragment information to the upper device in response to a request for the track information from the upper device. Also, when the optical disc is a CD–R, the optical disc device obtains the answer for a request for the track information from the upper device based on the track information recorded in the PMA as described above.

However, when the optical disc is a DVD+R, for example, as mentioned above, the fragment information is recorded in the SDCBs corresponding to the respective sessions. Thus, it is necessary for a conventional optical disc device to sequentially search the SDCBs in the respective sessions dispersed in the record area. Accordingly, there is a problem in that the speed of response with respect to a track information obtaining request from the upper device, that is, the performance is significantly degraded.

Therefore, it is conceivable to obtain all fragment information in advance when an optical disc is set to the drive unit. However, because of a similar reason as in the case above, a considerable amount of time is required for obtaining all fragment information. Thus, there is a problem in that time until user access is made possible after the optical disc is set to the drive unit, so called disc mount time, is increased. Further, as mentioned above, the DVD+R allows up to 3056 fragments to exist thereon. For this reason, considering the memory capacity, it is difficult to store all fragment information in the memory of the drive unit.

Additionally, even in a case where designated fragment information is read from the disc when the user makes a request for the fragment information, since the fragment information exists in the SCDBs of the respective sessions in a dispersed manner as mentioned above, it is necessary to sequentially search for the SCDBs having the designated fragment. In this case, the performance with respect to the request for the fragment information by the user is significantly degraded.

Regarding such problems, for the DVD+R, a method has been proposed and is to be adopted as the standard where a session of which data recording is completed (closed session) is reported as one track to the user even when a plurality of fragments exist in the session. That is, when an obtaining request for the management information includes a request for obtaining the number of tracks, each of the closed sessions among the sessions included in the record area is regarded as one track (a pseudo-track) so as to calculate the number of tracks in response to the request. This is because there is no concept of the track in the DVD, the fragment in the DVD+R is for data recording, and thus individual fragment information in the session of which data recording is completed is not important. In other words, when recording data, a write-once type disc such as the DVD+R requires information (fragment information) of tracks existing in sessions (open sessions) of which data recording is not completed. However, information (fragment information) of tracks in closed sessions to which data recording cannot be further performed is not important. Thus, there is no inconvenience if the number of the closed sessions is given as an answer to the track number obtaining request.

As a result, it is not necessary to check SCDBs in all sessions with respect to the management information obtaining request. It is possible to immediately obtain the number of the pseudo-tracks only from the SCDB in the last session. Consequently, the number of tracks is, at the maximum, 206 (=190 (the number of the pseudo-tracks)+16 (the number of tracks in an open session)). Thus, as in the case of the CD–R, it is possible to store information of each track in the memory of the drive unit in advance. Accordingly, a method is used in which, with respect to the management information obtaining request by the user, management information recorded in the SCDB of the last session is always reported.

However, despite such a DVD+R environment, there may still be a request for obtaining individual fragment information in the closed sessions. For example, depending on a category where the drive unit is used, a case exists where there is a request for obtaining individual fragment information in the closed sessions so as to confirm the fragment information in data-recording and the like.

In such a case, with respect to the management information obtaining request by the user, though the session information of the prior sessions is obtained, it is impossible to obtain the fragment information of the prior sessions, even if the management information is obtained from the SDCB of the last session. In other words, there is a problem in that the user cannot obtain individual fragment information in the closed sessions, since a means for reporting to the user the contents of the SDCBs of desired sessions does not exist, though individual fragment information in the closed sessions exists only in the SDCBs of the corresponding sessions.

SUMMARY OF THE INVENTION

It is a general object of the present invention to provide an improved and useful information reproducing apparatus, data management information obtaining method, data management information obtaining program, and storage medium in which the above-mentioned problems are eliminated.

It is another and more specific object of the present invention to provide an information reproducing apparatus, data management information obtaining method, data management information obtaining program, and storage medium that can obtain management information of a desired management information area without degrading performance, even under a condition where a reproducing target is an information recording medium on which a plurality of the management information areas exist, each of which management information areas is updated and recorded in a new area every time predetermined data recording is completed, regarding the management information.

It is still another object of the present invention to provide an information reproducing apparatus, data management information obtaining method, data management information obtaining program, and storage medium that can easily obtain fragment information in a desired session of which session data recording is completed, under a condition that a reproducing target is an information recording medium conforming to the standard of DVD+R.

It is a further object of the present invention to provide an information reproducing apparatus, data management information obtaining method, data management information obtaining program, and storage medium that can appropriately respond to designation by a user.

In order to achieve the above-mentioned objects, according to one aspect of the present invention, there is provided an information reproducing apparatus reproducing information of an information recording medium in which a record area is divided into a plurality of data areas, data are recorded for each of the divided data areas, management information relating to the data recording is recorded in a predetermined management information area, and the management information is updated and recorded in a new management information area every time predetermined data recording is completed, the information reproducing apparatus including: a receiving part receiving, from an external device, an obtaining request for the management information, the obtaining request including designation of a specific management information area; a management information obtaining part obtaining the management information relating to the data recording from the specific management information area designated in the received obtaining request; and a reporting part reporting, to the external device, the management information relating to the data recording obtained from the designated specific management information area.

According to the above-mentioned aspect of the present invention, the information reproducing apparatus is provided with an interface function that receives, from the external device, the obtaining request for the management information, which obtaining request includes the designation of the specific management information area, and obtains management information relating to data recording from the specific management information area designated in the received obtaining request. Thus, it is possible to obtain, without degrading performance, management information of the management information area that a user desires, even under a condition that a reproducing target is an information recording medium on which a plurality of the management information areas exist, and the management information area is updated and recorded in a new area every time predetermined data recording is completed with respect to the management information.

Also, the record area may include at least one session that includes a plurality of tracks as the data areas. In addition, the management information relating to the data recording, which management information is recorded in each of the management information areas, may include all track information in a session and all session information of sessions before the session.

Accordingly, it is possible to easily obtain the track information of a session by requesting for obtaining the management information with the designation of a desired management information area that belongs to the session of which track information is needed.

In addition, the information recording medium may be an information recording medium that conforms to the standard of DVD+R. Also, each of the management information areas may be a SDCB, and the track may be a fragment.

Accordingly, specifically, under a condition that the information recording medium that conforms to the standard of DVD+R is a reproducing target, it is possible to easily obtain, from the corresponding SDCB, fragment information in a desired session of which data recording is already completed.

Further, in the information reproducing apparatus according to the present invention, the reporting part may report, to the external device, the newest management information relating to data recording obtained from the designated specific management information area.

Accordingly, among the management information obtained from the specific management information area designated by the user via the external device, it is possible to report the newest management information that is added and updated.

Additionally, the information reproducing apparatus according to the present invention may further include a determining part determining whether or not the designated specific management information area exists on the information recording medium, wherein the reporting part makes an error report to the external device when the designated specific management information area does not exist.

Accordingly, when the management information area designated by the user via the external device does not exist on the information recording medium, since it is highly possible that an erroneous designation operation of management information area is performed, an error report is made. Thus, it is possible to avoid reporting, to the user, management information according to an erroneous management information area.

In addition, the information reproducing apparatus according to the present invention may further include a determining part determining whether or not the designated specific management information area exists on the information recording medium, wherein the reporting part reports, to the external device, management information relating to the data recording obtained from a last management information area when the designated specific management information area does not exist.

Accordingly, when the management information area designated by the user via the external device does not exist on the information recording medium, an error report is not made, but management information of the last management information area is reported. Hence, it is possible for the user to obtain the management information of the last management information area without bothering himself/herself about the number of the management information areas existing on the information recording medium.

Furthermore, the information reproducing apparatus according to the present invention may further include a default value determining part determining whether or not the designated specific management information area corresponds to a specific default value, the specific default value being set in advance with respect to designation of the specific management information area, wherein the reporting part reports, to the external device, management information relating to the data recording obtained from a last management information area when the designated specific management information area is the default value.

Accordingly, when the management information area is not specifically designated but is the default value, the management information obtained from the last management information area is reported. Hence, it is possible to maintain the compatibility with a method that always obtains the management information from the last management information area.

Additionally, according to another aspect of the present invention, there is provided a data management information obtaining method for an information recording medium in which a record area is divided into a plurality of data areas, data are recorded for each of the divided data areas, management information relating to the data recording is recorded in a predetermined management information area, and the management information is updated and recorded in a new management information area every time predetermined data recording is completed, the data management information obtaining method including the steps of: receiving, from an external device, an obtaining request for management information, the obtaining request including designation of a specific management information area; obtaining management information relating to data recording from the specific management information area designated in the received obtaining request; and reporting, to the external device, the management information relating to the data recording obtained from the designated specific management information area.

Accordingly, the information reproducing apparatus is provided with an interface function that receives, from the external device, the obtaining request for the management information, which obtaining request includes the designation of the specific management information area, and obtains management information relating to data recording from the specific management information area designated in the received obtaining request. Thus, it is possible to obtain, without degrading performance, management information of the management information area that a user desires, even under a condition that a reproducing target is an information recording medium on which a plurality of the management information areas exist, and the management information area is updated and recorded in a new area every time predetermined data recording is completed with respect to the management information.

Also, the data management information obtaining method may further include the step of: determining whether or not the designated specific management information area exists on the information recording medium, wherein the step of reporting makes an error report to the external device when the designated specific management information area does not exist.

Accordingly, when the management information area designated by the user via the external device does not exist on the information recording medium, since it is highly possible that an erroneous designation operation of management information area is performed, an error report is made. Thus, it is possible to avoid reporting, to the user, management information according to an erroneous management information area.

In addition, the data management information obtaining method according to the present invention may further include the step of: determining whether or not the designated specific management information area exists on the information recording medium, wherein the step of reporting reports, to the external device, management information relating to the data recording obtained from the last management information area when the designated specific management information area does not exist.

Accordingly, when the management information area designated by the user via the external device does not exist on the information recording medium, an error report is not made, but management information of the last management information area is reported. Hence, it is possible for the user to obtain the management information of the last management information area without bothering himself/herself about the number of the management information areas existing on the information recording medium.

The data management information obtaining method according to the present invention may further include the step of: determining whether or not the designated specific management information area corresponds to a specific default value, the specific default value being set in advance with respect to the designation of the specific management information area, wherein the step of reporting reports, to the external device, management information relating to the data recording obtained from the last management information area when the designated specific management information area is the specific default value.

Accordingly, when the management information area is not specifically designated but is the default value, the management information obtained from the last management information area is reported. Hence, it is possible to maintain the compatibility with a method that always obtains the management information from the last management information area.

Additionally, according to another aspect of the present invention, there is provided a data management information obtaining program installed in a computer of an information reproducing apparatus reproducing information of an information recording medium in which a record area is divided into a plurality of data areas, data are recorded for each of the divided data areas, management information relating to the data recording is recorded in a predetermined management information area, and the management information is updated and recorded in a new management information area every time a predetermined data recording is completed, the data management information obtaining program causing the computer to carry out a data management information obtaining process including the instructions of: causing the computer to receive, from an external device, an obtaining request for management information, the obtaining request including designation of a specific management information area; causing the computer to obtain management information relating to data recording from the specific management information area designated in the received obtaining request; and causing the computer to report, to the external device, the management information relating to the data recording obtained from the designated specific management information area.

Accordingly, the data management information obtaining program causes the computer to carry out an interface function that receives, from the external device, the obtaining request for the management information, which obtaining request includes the designation of the specific management information area, and obtains management information relating to data recording from the specific management information area designated in the received obtaining request. Thus, it is possible to obtain, without degrading performance, management information of the management information area that a user desires, even under a condition that a reproducing target is an information recording medium on which a plurality of the management information areas exist, and the management information area is updated and recorded in a new area every time predetermined data recording is completed with respect to the management information.

The data management information obtaining program according to the present invention may further include the instruction of: causing the computer to determine whether or not the designated specific management information area exists on the information recording medium, wherein the instruction of causing the computer to report causes the computer to carry out a process of making an error report to the external device when the designated specific management information area does not exist.

Accordingly, when the management information area designated by the user via the external device does not exist on the information recording medium, since it is highly possible that an erroneous designation operation of management information area is performed, an error report is made. Thus, it is possible to avoid reporting, to the user, management information according to an erroneous management information area.

In addition, the data management information obtaining program according to the present invention may further include the instruction of: causing the computer to determine whether or not the designated specific management information area exists on the information recording medium, wherein the instruction of causing the computer to report causes the computer to perform a process of reporting, to the external device, management information relating to data recording obtained from the last management information area when the designated specific management information area does not exist.

Accordingly, when the management information area designated by the user via the external device does not exist on the information recording medium, an error report is not made, but management information of the last management information area is reported. Hence, it is, possible for the user to obtain the management information of the last management information area without bothering himself/ herself about the number of the management information areas existing on the information recording medium.

Further, the data management information obtaining program according to the present invention may further include the instruction of: determining whether or not the designated specific management information area corresponds to a specific default value, said specific default value being set in advance with respect to the designation of the specific management information area, wherein the instruction of causing the computer to report causes the computer to report, to the external device, management information relating to data recording obtained from the last management information area when the designated specific management information area is the specific default value.

Accordingly, when the management information area is not specifically designated but is the default value, the management information obtained from the last management information area is reported. Hence, it is possible to maintain the compatibility with a method that always obtains the management information from the last management information area.

Additionally, according to another aspect of the present invention, there is provided a computer-readable storage medium storing the data management information obtaining program as described above.

Accordingly, it is possible to obtain similar effects obtained from the data management information obtaining program.

Other objects, features and advantages of the present invention will become more apparent from the following detailed description when read in conjunction with the following drawings.

BRIEF DESCRIPTION OF THE DRAWINGS

FIG. 3 is a table showing an example of the format of a SDCB;

FIG. 4 is a table showing an example of the format of "Fragment Item";

FIG. 5 is a table showing an example of the format of "Previous Session Item"

DETAILED DESCRIPTION OF THE PREFERRED EMBODIMENTS

Figure 1:
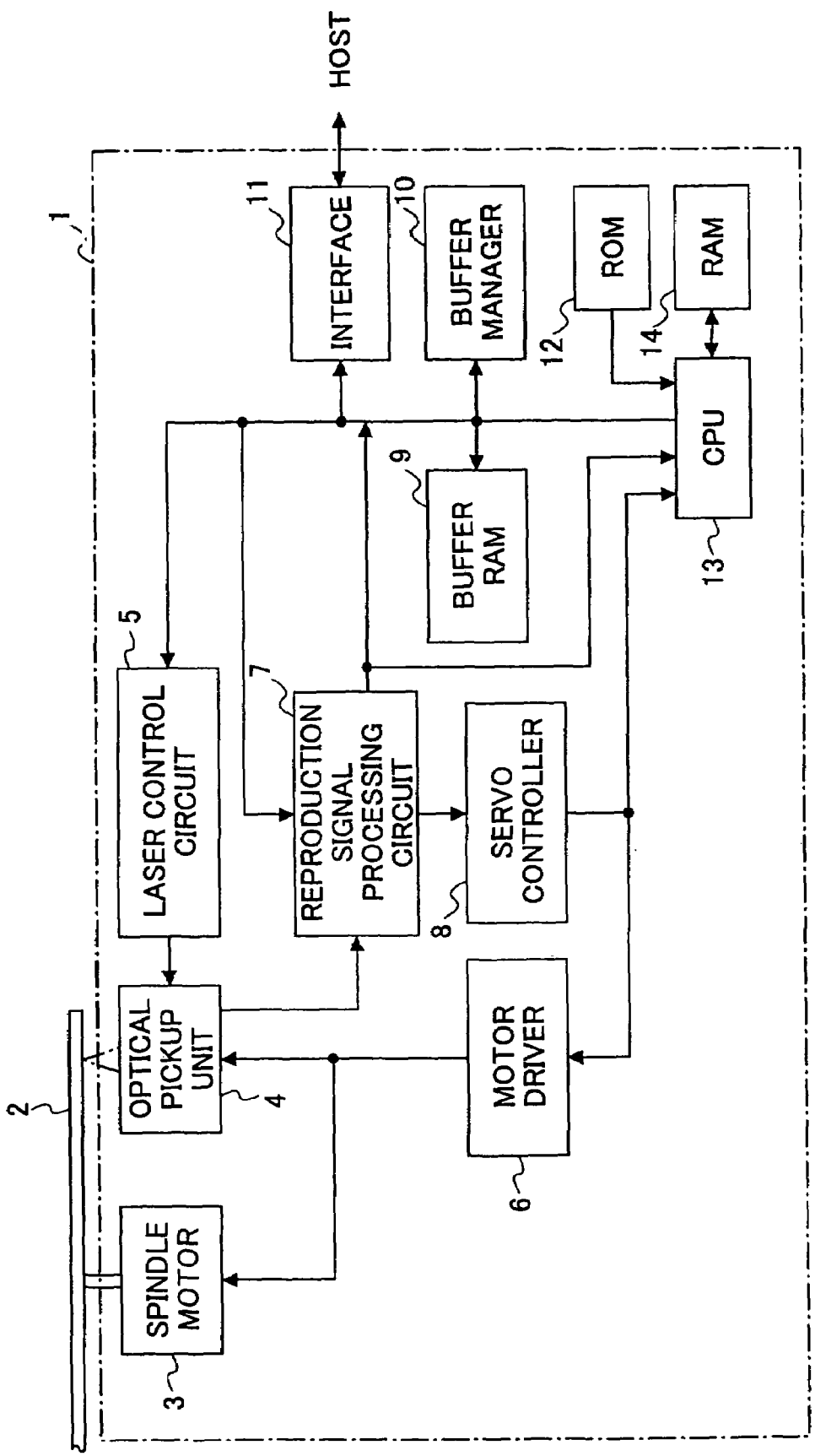
FIG. 1 is a block diagram showing a general structure of an optical disc device according to one embodiment of the present invention.

A description will be given of one embodiment of the present invention, with reference to the drawings. FIG. 1 is a block diagram showing the general structure of an optical disc device 1 as an information reproducing apparatus according to the embodiment.

The optical disc device 1 is constructed by a spindle motor 3 for driving an optical disc 2 as an information recording medium to rotate, an optical pickup unit 4, a laser control circuit 5, a motor driver 6, a reproduction signal processing circuit 7, a servo controller 8, a buffer RAM 9, a buffer manager 10, an interface 11, a ROM 12, a CPU 13, a RAM 14 and the like. It should be noted that arrows in FIG. 1 do not indicate all connections among the blocks, but indicate typical flows of signals and information.

More specifically, first, as the optical disc 2, an information recording medium conforming to the standard of the DVD+R (hereinafter simply referred to as a "DVD+R") is targeted.

The optical pickup unit 4 is constructed by including a semiconductor laser as a light source, an optical system that guides a laser beam emitted from the semiconductor laser to a storage surface of the optical disc 2 and includes an objective lens and the like guiding the returning beam reflected by the recording surface to a predetermined receiving position, a receiver arranged at the receiving position and receiving the returning beam, driving systems (focusing actuator, tracking actuator, seek motor and the like) (none of them are shown), and the like. The receiver outputs, to the reproduction signal processing circuit 7, a current (electric current signal) according to the amount of light received.

The servo controller 8 generates a control signal controlling the focusing actuator of the optical pickup unit 4 based on a focus error signal, and generates a control signal controlling the tracking actuator of the optical pickup unit 4 based on a track error signal. These control signals are output to the motor driver 6 from the servo controller 8.

The motor driver 6 drives, based on the control signals from the servo controller 8, the focusing actuator and tracking actuator of the optical pickup unit 4. In addition, based on an instruction from the CPU 13, the motor driver 6 controls the spindle motor 3 so that the linear velocity of the optical disc 2 becomes constant. Further, based on an instruction from the CPU 13, the motor driver 6 drives the seek motor for the optical pickup unit 4 so as to radially move the optical pickup unit 4 toward a target track of the optical disc 2.

The interface 11 is a two-way communication interface with a host (for example, a PC), which is an external device. The interface 11 conforms to the standard interfaces of ATAPI, SCSI, and the like.

The CPU 13 constitutes, with the ROM 12 and the RAM 14, a microcomputer (computer) that the optical disc device 1 includes. The ROM 12 that also functions as a storage medium stores a program including a data management information obtaining program, as described later, written in a code decodable by the CPU 13. The CPU 13 controls the operation of each of the above-described parts according to the program stored in the ROM 12, and temporarily stores such data as necessary for the control in the RAM 14. It should be noted that the program stored in the ROM 12 is loaded (installed) to a main memory (not shown) of the CPU 13 when the power of the optical disc device 1 is turned ON.

Next, a description will be given of an example of a multi-session format of the DVD+R constituting the optical disc 2 that is the target of this embodiment, by referring to a schematic diagram of FIG. 2. It should be noted that the file system of the optical disc 2 conforms to the sequential UDF standard.

Figure 2:
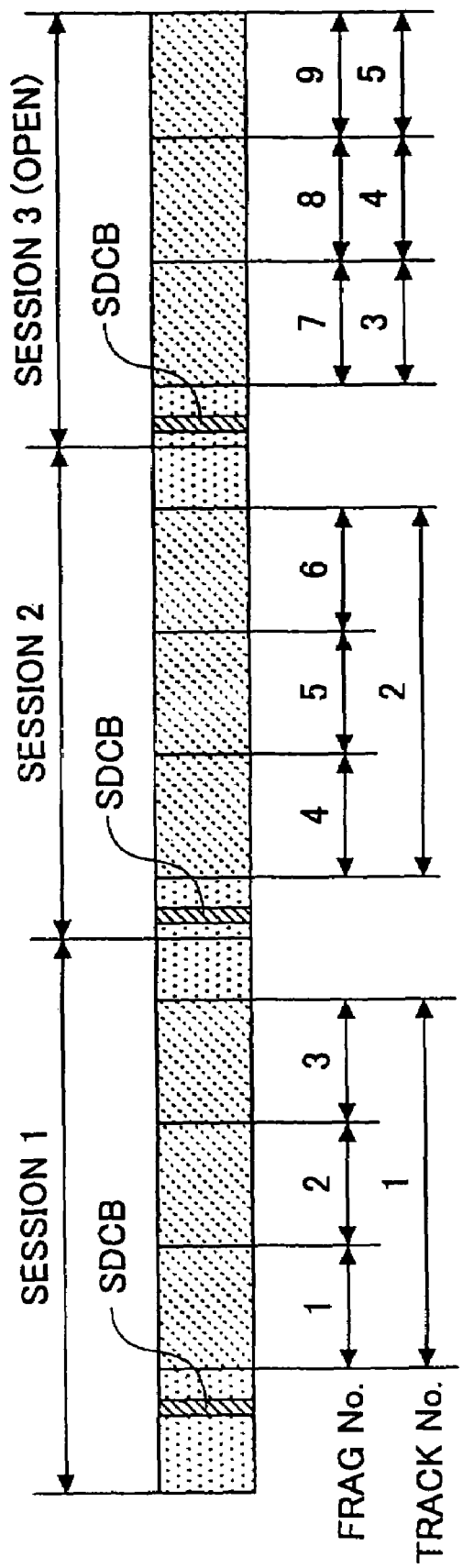
FIG. 2 is a schematic diagram showing an example of a multi-session format of a DVD+R.

In the example shown in FIG. 2, for ease of explanation, a case is shown where two closed sessions, Sessions 1 and 2 of which data recording is completed, and one open session, Session 3 of which data recording is started but not completed exist on the optical disc 2, for example. Each of the Sessions 1, 2 and 3 includes three fragments (nine fragments indicated by Frag. No. 1 through 9). For each of the Sessions 1, 2 and 3, every time data recording of each session is completed, the SDCB (session disc control block) constituting a management information area is secured in a predetermined area, for example, a lead-in (or an intro), and management information relating to the data recording is recorded.

FIG. 3 shows an example of such a SDCB format. As shown in FIG. 3, the SDCB includes descriptions of "Contents Descriptor", "Unknown Contents Descriptor Actions", "Drive ID", "Session Number" and the like. Further, as information specific to the SDCB, the SDCB includes a plurality of (0 through N) "Session Items", each being constructed by 16 bytes.

Such "Session Item" includes two kinds: Fragment Item indicating fragment information in the session; and Previous Session Item indicating session information of the sessions before this session.

FIG. 4 shows an example of the format of the "Fragment Item". The format of the "Fragment Item" is set such that the fragment information of "Fragment number", "Fragment start address", "Fragment end address" and the like is written as the management information. Such "Fragment Item" is prepared, as one of the "Session Items", for each fragment existing in the session. In the example shown in FIG. 2, three "Fragment Items" exist for each of the SDCBs.

FIG. 5 shows an example of the format of the "Previous Session Item". The format of the "Previous Session Item" is set such that session information of "Previous session number", "Previous session start address", "Previous session end address" and the like are written as the management information. Such "Previous Session Item" is prepared, as one of the "Session Items", for each session existing before the session.

Each of the SDCBs includes a recordable area. The information of the SDCB is added in a similar manner when a track or a session is added, for example.

Returning to FIG. 2, in the multi-session format as shown in FIG. 2, with respect to the closed sessions as indicated by the Sessions 1 and 2, the optical disc device 1 is set so as to make a report, to the host, by regarding each of the sessions as one track, even if a plurality of tracks (fragments) exist in the session. Accordingly, as shown in FIG. 2, the track numbers of the closed sessions are equal to the session numbers. On the other hand, with respect to the open session as indicated by the Session 3, the number of fragments matches the number of tracks. That is, the track number of the first track of the open session is the session number, and the track numbers thereafter are incremented one by one. In the example shown in FIG. 2, the fragment numbers 1 through 3 are regarded as the track number 1, the fragment numbers 4 through 6 are regarded as the track number 2, and the fragment numbers 7, 8 and 9 are regarded as the track numbers 3, 4 and 5, respectively.

Thus, under such a condition, it is possible to immediately obtain the fragment information in the session 3 and the number of tracks in the record area, by obtaining and reporting the management information that is written in the last SDCB included in the Session 3, which is the last session, with respect to the management information obtaining request from the host side. Therefore, setting is made such that the last SDCB included in the last session becomes the target of the management information obtaining request from the host side.

Under such a condition, with respect to the previous sessions, only the session information is obtained and the fragment information cannot be obtained. In other words, there is a problem in that the user cannot obtain individual fragment information in the closed sessions, since a means for reporting, to the host, the contents of the SDCB of a desired session does not exist, though individual fragment information in the closed sessions exists only in the SDCB of the corresponding session. In the example shown in FIG. 2, it is impossible to obtain the fragment information with respect to the fragment numbers 1 through 6.

Thus, in this embodiment, an interface is added that can provide access to the SDCB of a desired session and obtain the fragment information in the session so that even the management information of past SDCBs can be arbitrarily reported.

A description will be given of an example of control of a data management information obtaining process carried out by the CPU 13 in the optical disc device 1 according to this embodiment, with reference to the flow chart shown in FIG. 6. In this embodiment, in order to add the above-described interface, it is assumed that the host side designates the session number so as to specify a desired SDCB when making an obtaining request for the management information. When specifying the SDCB by designating the session number, it is possible to specify the last SDCB belonging to the last session by inputting the session number thereof. However, it is assumed that a field for designating the session number is normally set to a default setting (in this embodiment, a session number "0", which does not exist on the optical disc 2, is set) so that the last SDCB can be designated without specifically designating the session number.

Additionally, in the optical disc device 1, when the optical disc 2 is mounted to a predetermined position of the optical disc device 1, the CPU 13 obtains information relating to the closed session recorded on a predetermined position in the record area of the optical disc 2, extracts the address of the last closed session based on the information, and checks whether or not an open session exists following the closed session. When an open session exists, the record contents of the SDCB of the open session are read and copied to the RAM 14. When an open session does not exist, the record contents of the SDCB of the last closed session are read and copied to the RAM 14. In other words, it is assumed that prior to the process of this embodiment, which is to be explained by using FIG. 6, the management information of the last SDCB is already copied to the RAM 14. In the example of FIG. 2, the management information written in the last SDCB included in the Session 3 is copied to the RAM 14.

First, when there is a request for obtaining management information with the designation of the session number from the host side, the designated session number is obtained in step S1. When the designated session number is obtained, it is determined whether or not the session of the session number exists on the optical disc 2 in step S2. The determination is made based on the limitation that the number of sessions that can exist on the optical disc 2 is up to 191 sessions in a case of a DVD+R, and by referring to the session information obtained from the last SDCB and already stored in the RAM 14.

When the session of the designated session number exists on the optical disc 2 (YES in step S2), the management information as shown in FIGS. 3 through 5 recorded in the SDCB belonging to the session of the designated session number is read from the optical disc 2 in step S3. As access control to the SDCB in this case, for example, referring to the management information of the last SDCB already stored in the RAM 14, the session start address of the designated session may be read, and the SDCB of the target session may be searched based on the address. By reading the SDCB, it is possible to obtain the management information such as the number of each fragment existing in the session, and the fragment information such as the address and the like. For instance, in the example shown in FIG. 2, when the Session 2 is designated, it is possible to obtain, from the SDCB belonging to the Session 2, the fragment information relating to the fragments 4, 5 and 6 in the Session 2.

Thereafter, in step S4, the management information including the fragment information obtained from the SDCB of the designated session is reported to the host side (user), and the management information obtaining process ends. The contents of the management information reported to the host side are the newest management information in the session of the session number that is designated by the user. For example, when there is a session deletion or the like before the session designated by the user, management information including the deletion information is reported.

On the other hand, when the session of the designated session number does not exist on the optical disc 2 (NO in step S2), in step S5, it is determined whether or not the session number is a default value with respect to the session number designation of the optical disc device 1. This is because, in this embodiment, the default value with respect to the session number designation is set to the session number 0.

As a result of the determination, when the session number is not the default value but the session number does not exist on the optical disc 2 (NO in step S5), no particular process is performed, and an error report is made to the host side via the interface 11 in step S6.

Accordingly, when the session number designated by the user via the host does not exist on the optical disc 2, it is highly possible that an erroneous session number designation operation is made. Thus, by making an error report, it is possible to avoid reporting, to the user, the management information of an erroneous SDCB.

In addition, when the designated session number is the default value (YES in step S5), the management information including the fragment information obtained from the last SDCB is reported to the host side via the interface 11 in step S7, and the management information obtaining process ends. Since the management information obtained from the last SDCB is already stored in the RAM 14, the report in this case is made by reading the management information from the RAM 14.

That is, as mentioned above, when a method is employed where the management information is always obtained from the last SDCB, the user makes the management information obtaining request without designating the session number. Even in a method where the designation of the session number is required as in this embodiment, the field for designating the session number is set to the session number 0 as the default setting so that input of a specific number is not required even when the last SDCB is to be designated. However, when the error report (step S6) is made on the grounds that the session number 0 does not exist on the optical disc 2, compatibility with the method where the management information is always obtained from the last SDCB is lacking. Thus, the last session number to which the last SDCB belongs must be designated. In that respect, it is possible to maintain compatibility with the method where the management information is always obtained from the last SDCB by reporting the management information obtained from the last SDCB when the session number is not specifically designated but the default value is set.

Figure 6:
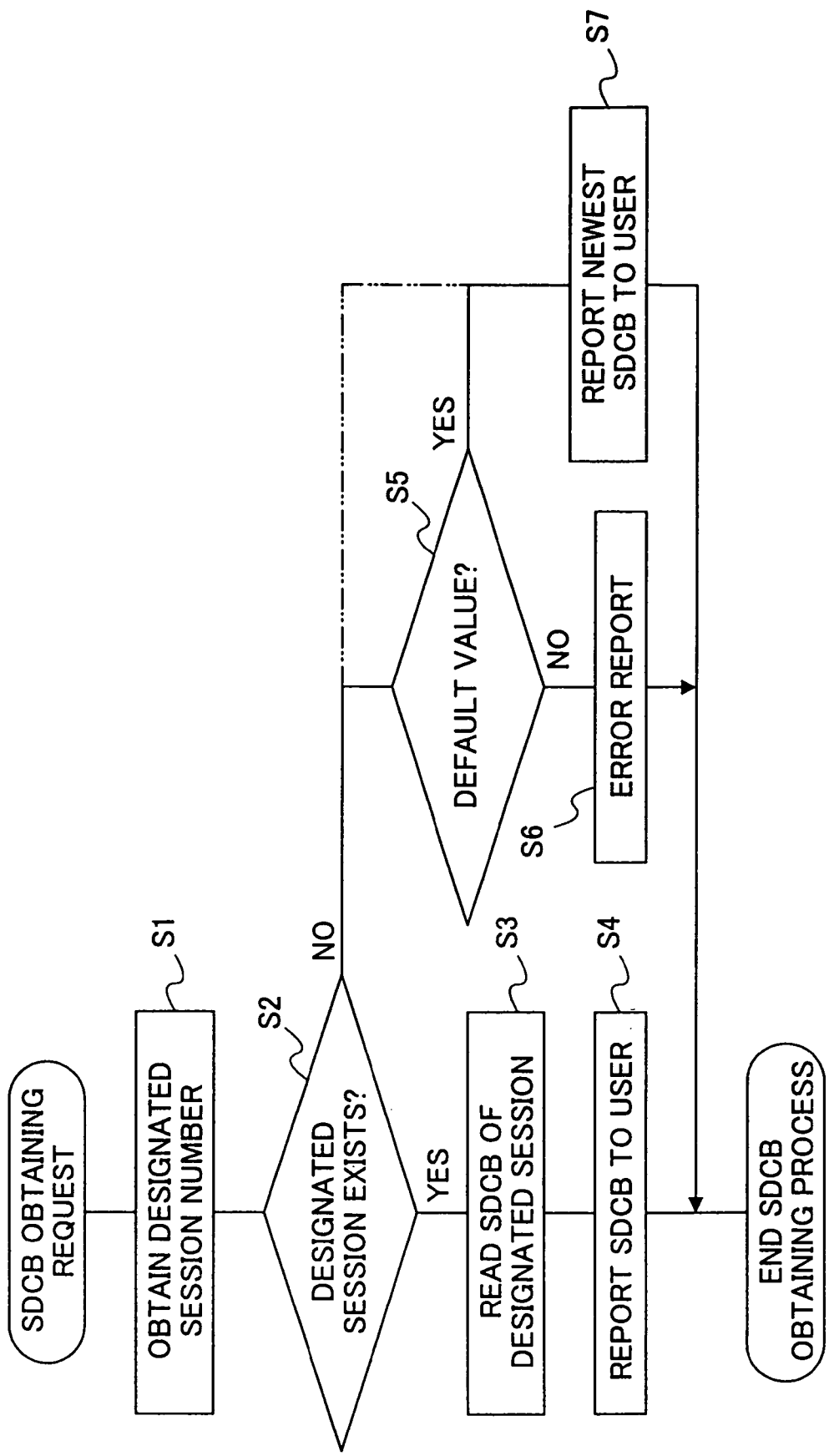
FIG. 6 is a flow chart generally showing an example of a management information obtaining process.

Further, when the designated session number does not exist on the optical disc 2 (NO in step S2), as indicated by a two-dot chain line in FIG. 6, without making the error report (step S6) whether the session number is the default value or not, the management information including the fragment information obtained from the last SDCB may be reported to the host side via the interface 11 (step S7), and the management information obtaining process may be ended. Since the management information obtained from the last SDCB is already stored in the RAM 14, the report in this case is performed by reading the management information from the RAM 14.

In other words, it is possible for the user to obtain the management information of the last SDCB without bothering himself/herself about the number of sessions existing on the optical disc 2, when the session number that is designated by the user via the host does not exist on the optical disc 2. For example, in the DVD+R as in this embodiment, up to 191 sessions can exist. However, when a session number larger than this is designated intentionally, it is possible to obtain the management information of the last SDCB, irrespective of the number of sessions existing on the optical disc 2. Accordingly, it is possible to correspond to a case where the default value for obtaining the management information of the last SDCB is not set.

Further, in this embodiment, the description has been given for the case where the optical disc 2 is a DVD+R. However, the present invention may be applied to information recording media on which data recording is made by dividing the record area into a plurality of data areas such as sessions and tracks, management information relating to the data recording is recorded in predetermined management information areas, and the management information is updated and recorded to a new management information area every time predetermined data recording is completed.

Also, the optical disc device 1 of this embodiment may be a so-called built-in type, which is arranged in the same housing as that of the host, or a so-called external type, which is arranged in a housing different from that of the host.

Furthermore, the description has been given of the case where the optical disc device is used as the information reproducing apparatus. However, information reproducing apparatuses capable of using information recording media on which data recording is made by dividing the record area into a plurality of data areas such as sessions and tracks, management information relating to the data recording is recorded in predetermined management information areas, and the management information is updated and further recorded to a new management information area every time a predetermined data recording is completed may be used. Of course, information recording/reproducing apparatuses having a recording function as well as a reproducing function may be used.

The present invention is not limited to the specifically disclosed embodiments, and variations and modifications may be made without departing from the scope of the present invention.

The present application is based on Japanese priority application No. 2002-005824 filed on Jan. 15, 2002, the entire contents of which are hereby incorporated by reference.

What is claimed is:

1. An information reproducing apparatus comprising:
a memory configured to temporarily store management information representing data recording in each of a plurality of data areas divided in a recording region of an information recording medium, the management information being recorded in a predetermined management information area and updated every time data recording has been completed, said management information including track information regarding tracks existing in the corresponding data area and data area information about all preceding data areas, where said track information exists only in the management information of the corresponding data area;
a receiving unit configured to receive a management information obtaining request, together with designation of a prescribed management information area corresponding to one of the data areas;
a management information obtaining unit configured to acquire the requested management information from the memory if it is stored in the memory, and to acquire the requested management information from the information recording medium based on the designation of the management information area if the requested management information is not stored in the memory; and a reproducing unit configured to reproduce the data recorded in the information recording medium based on the acquired management information.

2. The information reproducing apparatus of claim 1, wherein the management information obtaining unit is further configured to detect the designated management information area in the information recording medium and acquire the management information from the detected management information area.

3. An information reproducing method comprising the steps of:

temporarily storing management information representing data recording in each of a plurality of data areas divided in a recording region of an information recording medium, the management information being recorded in a predetermined management information area and updated every time data recording has been completed, said management information including track information regarding tracks existing in the corresponding data area and data area information about all preceding data areas, where said track information exists only in the management information of the corresponding data area;

receiving a management information obtaining request, together with designation of a prescribed management information area corresponding to one of the data areas;

determining whether the requested management information is stored in the memory;

acquiring the requested management information from the memory if it is stored in the memory, and acquiring the requested management information from the information recording medium based on the designation of the management information area if the requested management information is not stored in the memory; and reproducing the data recorded in the information recording medium based on the acquired management information.

4. The method of claim 3, wherein the management information acquiring step includes the steps of:

detecting the designated management information area in the information recording medium; and acquiring the requested management information from the detected management information area.

* * * * *